United States Patent Office 3,091,347
Patented May 28, 1963

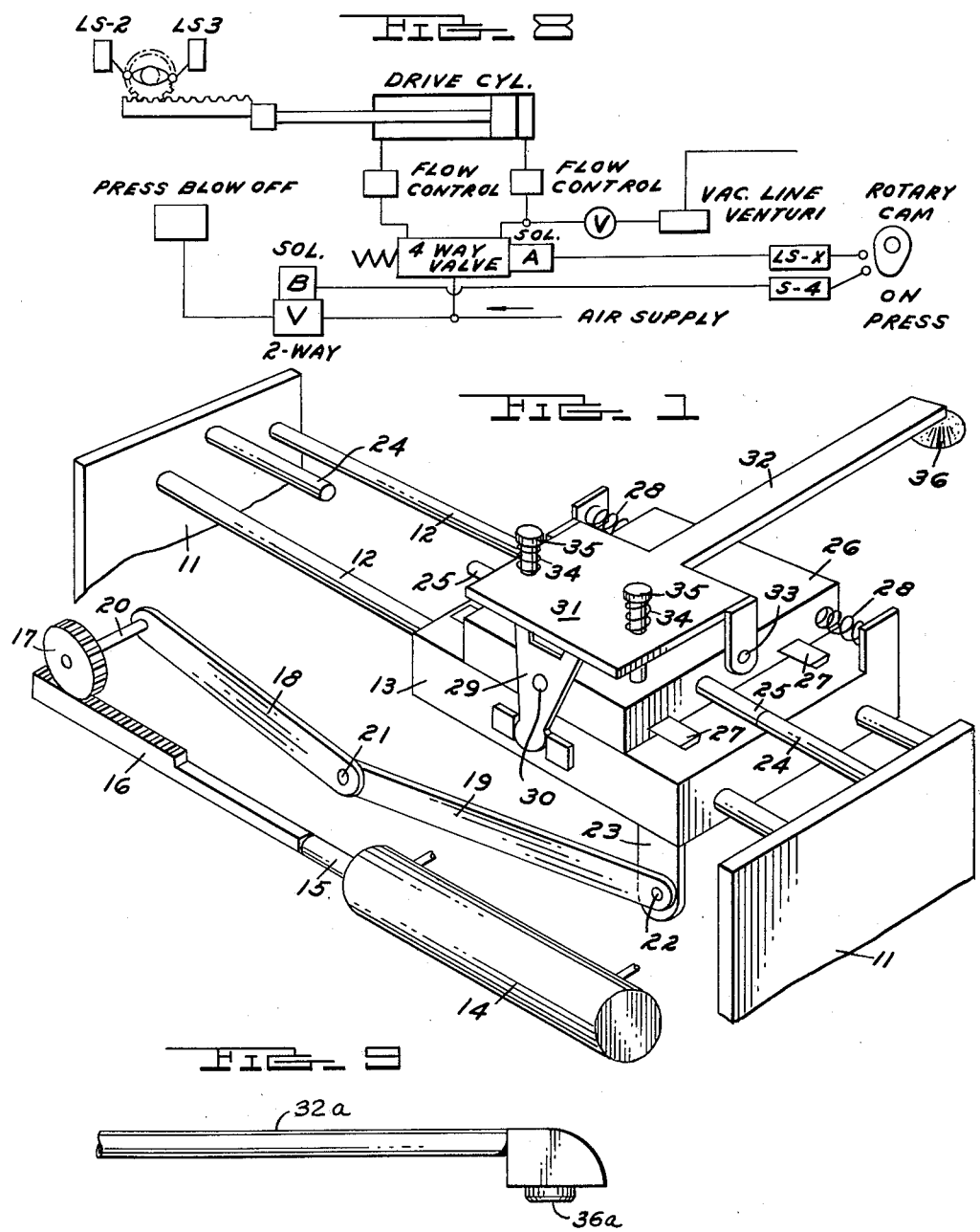

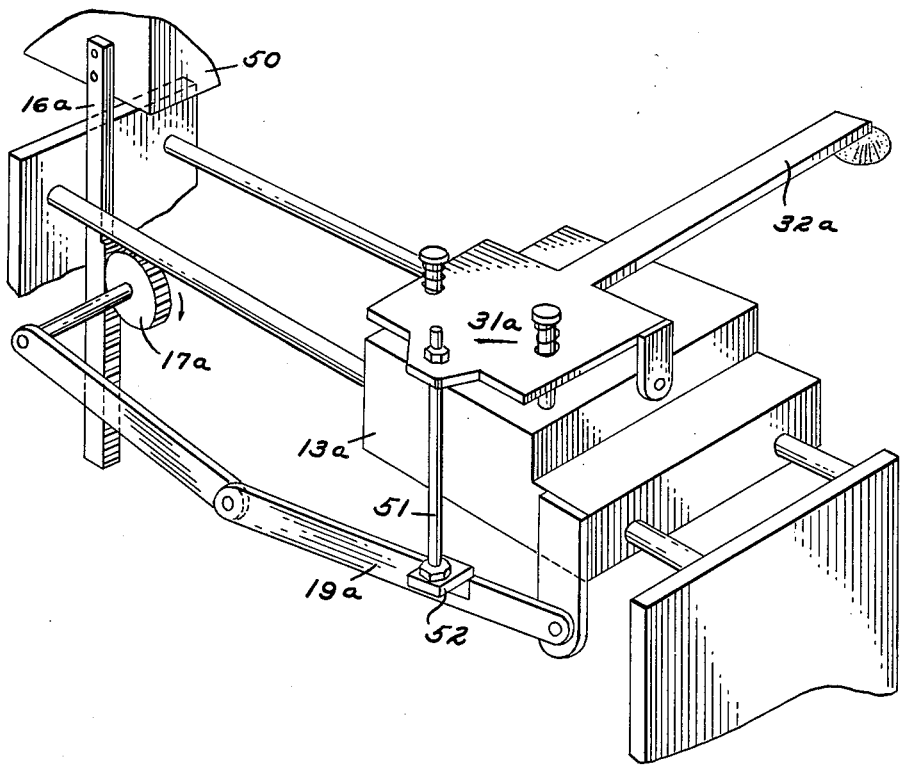

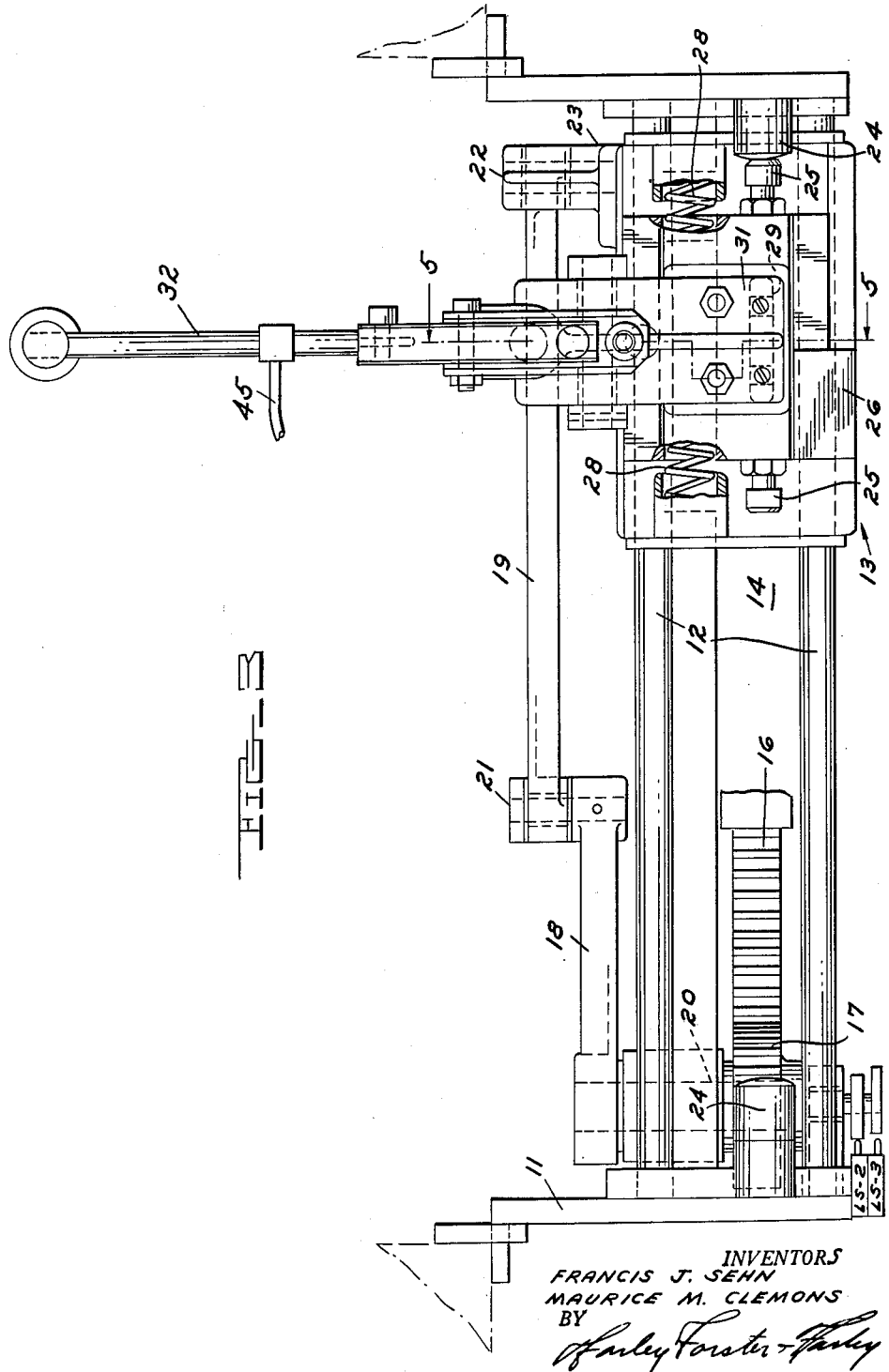

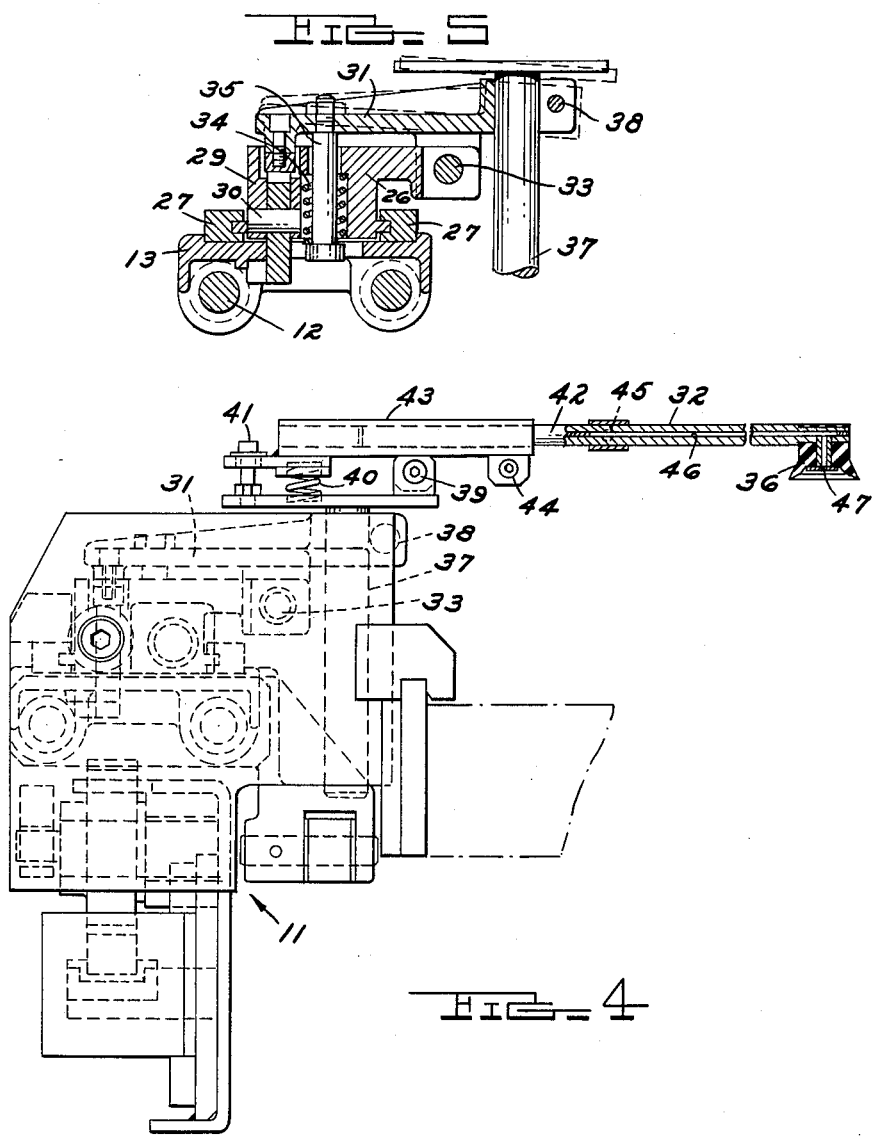

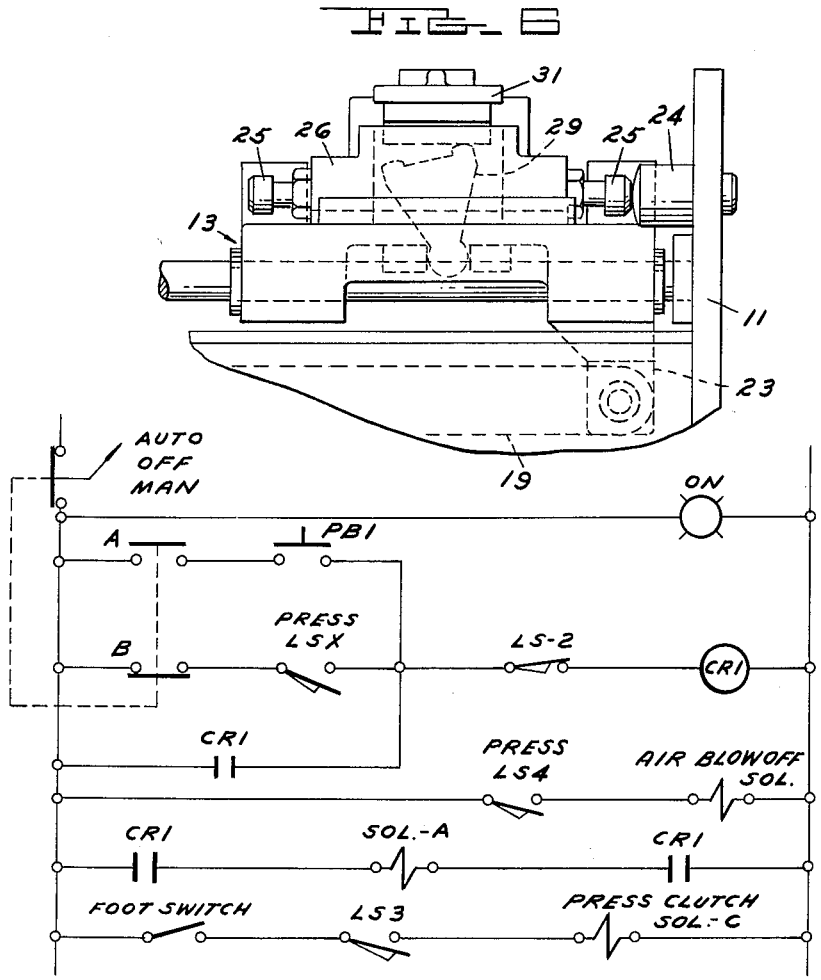

3,091,347
DEVICE FOR LOADING AND UNLOADING PRODUCTION PARTS
Francis J. Sehn, Bloomfield Hills, and Maurice M. Clemons, Birmingham, Mich.; said Clemons assignor to said Sehn
Filed Dec. 23, 1959, Ser. No. 861,490
2 Claims. (Cl. 214—1)

This invention relates to a device for loading or unloading parts into a press or machine utilizing a vacuum, magnetic or mechanical pickup arm.

The hazards of manual press feeding have led to numerous safety devices which, in many cases, limit or curtail the operator's freedom of movement, require dual manual switch actuation after loading of the part or otherwise hamper the rapid and efficient cycling of the press inherently possible insofar as the power operations are concerned. The primary object of the present device is to make it unnecessary for the press operator to at any time place his hands within the press for a loading or unloading operation thereby eliminating the basic danger to the operator together with the need for any hampering safety devices. This, together with location of the loading station outside of the press at a position more conveniently accessible to the operator, has made possible greatly accelerated press cycling multiplying production output.

In essence, the device provides a mechanical part movement between a loading or unloading station exterior of the press and a working station such as on a lower die within the press through use of a carriage mounted for reciprocating movement along a linear path having a distance corresponding to the spacing between the respective stations. A pickup arm is mounted on the carriage for pickup and depositing movement relative to the carriage at the ends of its reciprocating stroke. Harmonic acceleration and deceleration of carriage movement is provided through a rack, pinion and double link drive to the carriage while the pickup arm movement is derived from the carriage drive at either end of its stroke.

The operation and objects of the device will be more completely understood from the following description of a particular commercial embodiment of the device with reference to drawings wherein:

FIGURE 1 is a perspective schematic view of the device;

FIGURE 2 is a view similar to FIGURE 1 showing an alternative direct press drive for the rack and a modified mechanism for actuating the pickup arm.

FIGURE 3 is a plan view of the device;

FIGURE 4 is an end elevation of the device;

FIGURE 5 is a fragmentary sectional view taken along the line 5—5 of FIGURE 3;

FIGURE 6 is a fragmentary side elevation of the carriage and pickup arm shown in FIGURE 3 with the carriage at the end of its stroke;

FIGURE 7 is a schematic electrical control diagram for the device;

FIGURE 8 is a schematic diagram of the pneumatic circuit employed; and

FIGURE 9 is a side elevation of an alternative magnetic pickup arm.

Referring to FIGURE 1, a fixed frame 11 is provided with a pair of fixed guide rails 12 on which carriage 13 is mounted for reciprocating movement by a fixed cylinder 14, piston rod 15, rack 16, fixed axis pinion 17, primary link 18, and secondary link 19. The link 18 is rigidly connected to the pinion 17 by a drive shaft 20 and is pivotally connected at 21 to the link 19 which in turn is pivotally connected at 22 to a rigid carriage drive arm 23.

Reciprocation of the piston rod 15 and rack 16 is preferably adapted to drive the link 18 through a full 180° arc and into full alignment with the link 19 at either end of the stroke thus providing a simple harmonic motion for the carriage 13 derived from a constant speed actuation of the cylinder 14. The fixed stop 24 at either end of the fixed frame 11 engages an abutment 25 fixed to either end of slide 26 mounted on guideways 27 to the carriage 13. A pair of compression springs 28 normally urge the slide 26 to an intermediate position on the carriage 13 but upon the engagement of an abutment 25 with a stop 24 near either end of the travel of the carriage 13, movement of the slide 26 is interrupted as the carriage completes its travel. The resulting relative movement between carriage 13 and slide 26 actuates a rocker arm 29 pivotally connected at 30 to the slide 26 raising the tailplate 31 of pickup arm 32 pivotally connected at 33 to the slide 26 overcoming compression springs 34 mounted on bolts 35 connected to the slide 26 urging the tailplate 31 downwardly. It will be seen that the upward movement of the tailplate 31 at either end of the stroke of the carriage 13 will move the pickup arm 32 and vacuum cup 36 downwardly as required for pickup and depositing operations. In the commercial embodiment illustrated in FIGURES 3–6, equivalent components have been given the same reference numerals as in FIGURE 1. Additional features include a vertical adjustment post 37 for raising, lowering and swivelling the pickup arm to any desired position held in adjusted position by the clamping screw 38, and a pivotal mounting 39 for the pickup arm proper urged by compression spring 40 to a position limited by adjustment screw 41 serving to cushion the engagement of a part in response to the positive displacement of the tailplate 31. A further adjustment of the pickup arm 32 is provided by the slidable engagement of rod 42 in tubular element 43 providing both axial and swivelling adjustment of the arm 32 when the clamping screw 44 is loosened permitting the vacuum cup 36 to be precisely adjusted to desired part engagement position. A vacuum hose line 45 (FIGURES 3 and 4) communicates with longitudinal passage 46 and vacuum cup passage 47.

The control circuit for establishing such vacuum and cycling of the device is shown in FIGURES 7 and 8. A selector switch designated "auto, off, man" (FIGURE 7) provides automatic, off and manual operation. In the automatic position shown the manual "A" contacts are open, the "B" contacts are closed and an energizing circuit for control relay CR1 is established by the tripping of limit switch LSX, located on the press for actuation during its retraction stroke. Control relay CR1, sealed in by its own contact, energizes solenoid SOL A which actuates a four-way spring return valve releasing air to the right end of the drive cylinder (FIGURE 8) and to a vacuum line venturi which produces a vacuum in line 45 (FIGURE 3) leading to the suction cup causing a part to be picked up and the drive cylinder to be moved forward driving the carriage forward, carrying the part into the press and placing it in a proper position in the die. Limit switch LS2 (FIGURES 3, 7 and 8) deenergizes relay CR1 which de-energizes solenoid SOL A turning off the vacuum releasing the part and reversing the drive cylinder to return the carriage to starting position. This actuates limit switch LS3 (FIGURES 3 and 6) energizing the press clutch solenoid SOL C if the foot switch is pressed starting a press cycle. As the die starts to open, the rotary cam on the press (FIGURE 8) trips limit switch LS4 energizing solenoid SOL B on a two-way valve which actuates a press blow off for a period depending on the length of the cam thus completing the cycle. In the manual position the "B" contacts are open, the "A" contacts closed and the cycle initiated by push button PB1.

In the event a magnetic pickup arm 32a as illustrated in FIGURE 9, is employed instead of a vacuum cup, a similar circuit for energizing the magnetic pickup 36a may readily be provided by one skilled in the art.

In FIGURE 2, an alternative drive is illustrated wherein a rack 16a is mounted on and driven by the reciprocating head of the press 50 shown near its lowermost position. As the press head rises, the pinion 17a, is actuated moving carriage 13a as in the embodiment of FIGURE 1. An alternative means for actuating arm 32a is also shown comprising an adjustable push rod 51 engaged by bracket 52 on arm 19a during the last portion of its stroke at either end of the carriage's travel raising the tailplate 31a and lowering the arm 32a to pickup position.

It will be understood that these alternative features need not be employed in combination since either the push rod 51 alone or the press driven rack 16a could be employed in the embodiment of FIGURE 1 without the other. Rack 16a produces a somewhat different timing in operation from that of the main embodiment. If driven by a conventional crank type press, rack 16a will itself travel at a variable speed so that the resultant travel of the carriage will derive from two superimposed harmonic motions. This will tend to produce a slower movement of the carriage near the pickup and delivery extremities of its travel.

In the case of the push rod 51, the pickup arm 32a is actuated during its final linear travel rather than after its linear travel has been arrested as in the previous embodiment.

It will be understood that the device may be readily modified to unload parts from a press. For example, by merely connecting the venturi to the pressure line leading to the other side of the drive cylinder (FIGURE 8) and dispensing with the press blow off the device will operate to pickup a part from a die in the press and release it at the outside station.

While a particular embodiment with certain modifications has been described above in detail, it will be understood that numerous other modifications might be resorted to without departing from the scope of the invention as defined in the following claims.

We claim:
1. A device for loading or unloading parts from a press or like machine comprising a stationary frame, longitudinal guide means on said frame, a longitudinally reciprocable carriage mounted on said guide means, an element longitudinally displaceably mounted on said carriage, a pickup arm pivotally mounted on said element, means for reciprocating said carriage between end positions along said guide means, means at either end of the travel of said carriage for arresting the longitudinal travel of said element before an end position of said carriage is reached, and means responsive to the relative movement of said element in either longitudinal direction relative to said carriage for actuating said pickup arm in the same direction about its pivotal axis.

2. A device for loading or unloading parts from a press or like machine comprising a stationary frame, longitudinal guide means on said frame, a longitudinally reciprocable carriage mounted on said guide means, an element longitudinally displaceably mounted on said carriage, a pickup arm pivotally mounted on said element, means for reciprocating said carriage between end positions along said guide means, means at either end of the travel of said carriage for arresting the movement of the said element before the end position of said carriage is reached, and pivotal rocker arm means responsive to the relative movement of said element in either longitudinal direction relative to said carriage for actuating said pickup arm in the same direction about its pivotal axis.

References Cited in the file of this patent

UNITED STATES PATENTS

| | | |
|---|---|---|
| 1,959,512 | Wall et al. | May 22, 1932 |
| 2,040,028 | Smith et al. | May 5, 1936 |
| 2,071,859 | Steiner | Feb. 23, 1937 |
| 2,143,026 | Nordquist | Jan. 10, 1939 |
| 2,653,502 | Meyer et al. | Sept. 29, 1953 |
| 2,665,013 | Socke | Jan. 5, 1954 |
| 2,894,616 | Young | July 14, 1959 |
| 2,943,750 | Sehn | July 5, 1960 |